Oct. 18, 1932.  T. VAN TUYL  1,883,848
LIQUID FEEDING DEVICE
Original Filed Jan. 28, 1929
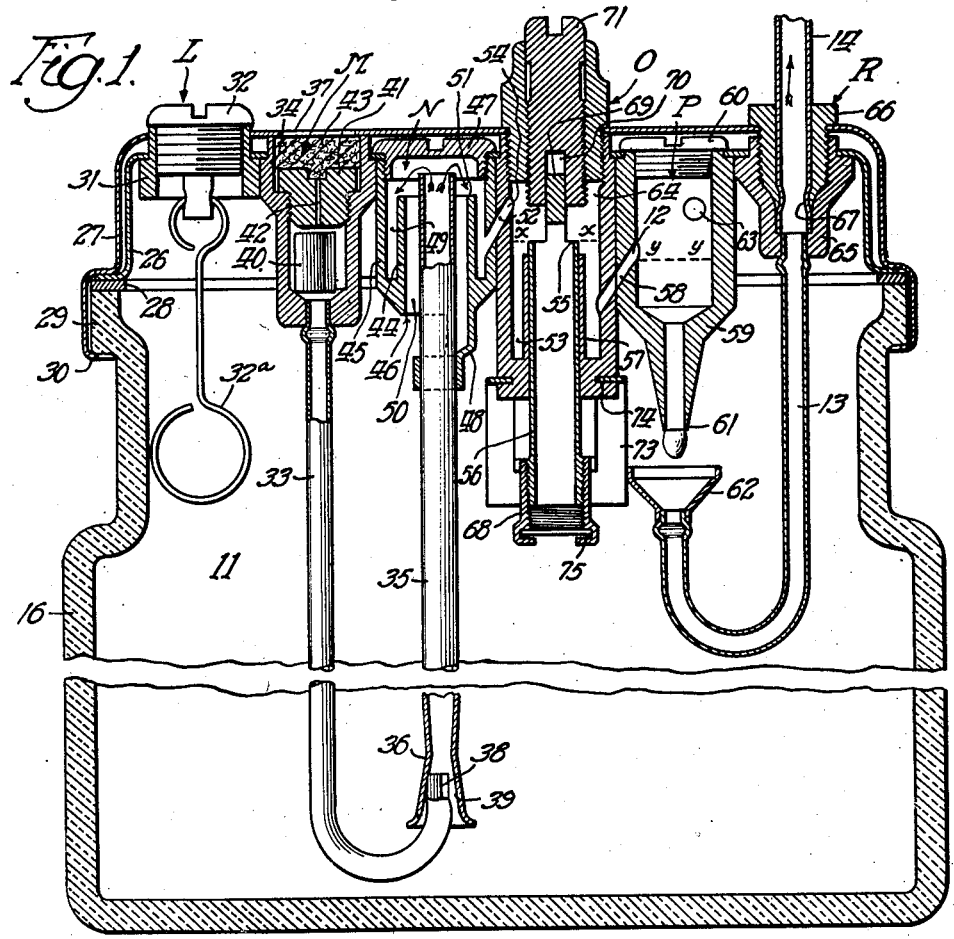
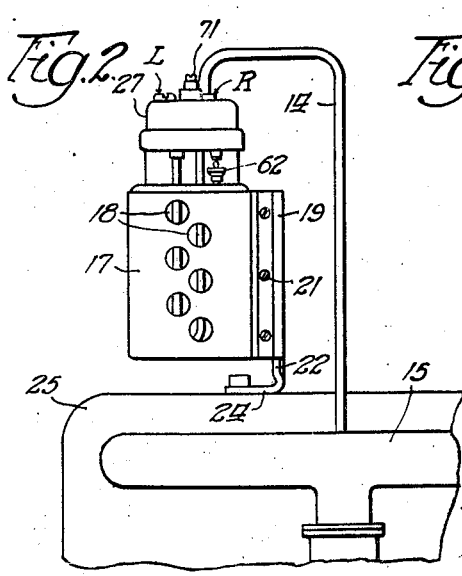
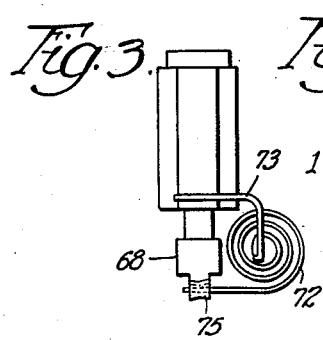
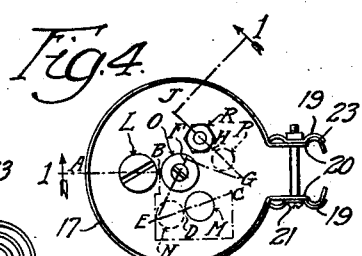
Inventor
Thomas Van Tuyl
By Emery, Booth, Janney, Varney
Atty.

Patented Oct. 18, 1932

1,883,848

UNITED STATES PATENT OFFICE

THOMAS VAN TUYL, OF OAK PARK, ILLINOIS, ASSIGNOR TO JAY MANUFACTURING COMPANY, A CORPORATION OF ILLINOIS

LIQUID FEEDING DEVICE

Application filed January 28, 1929, Serial No. 335,509. Renewed November 30, 1931.

This invention relates to liquid supply or feeding devices, and aims to provide a device for reliably supplying liquids in regular but minute quantities.

The nature of the invention may be readily understood by reference to one construction embodying the invention and shown in the accompanying drawing.

In said drawing:

Fig. 1 is a diagrammatic sectional view taken on the broken line 1—1 of Fig. 4 so arranged that the various elements appear in functional sequence;

Fig. 2 is an elevation of the device applied to an internal combustion engine;

Fig. 3 is an elevation of a detail of the apparatus showing the temperature-responsive controlling device; and Fig. 4 is a plan view of the device and the clamp by means of which it is attached.

The illustrative device is designed for supplying lubricant and has been shown applied to an internal combustion engine for supplying regular but minute quantities of lubricant to the cylinder combustion space for lubricating the valves, valve stems, upper cylinder walls, et cetera. Control of lubricant feed to avoid the supply of excess lubricant is effected in the present instance by placing the effective lubricant supply under a relatively low hydraulic head. While excess of lubricant is not objectionable in many instances, it is objectionable in lubricating the valves, valve stems and upper cylinder walls of an internal combustion engine, for well known reasons. It is, therefore, advantageous that the lubricant supply device function to supply only the necessary amount of lubricant, but no more.

The details of the illustrative device are sufficiently shown in Fig. 1 which is a diagrammatic sectional view, which has been taken, for clarity of illustration, on the broken line 1—1 of Fig. 4, with the various elements arranged in a sort of functional sequence. The true relative position of the various elements of the device is shown in Fig. 4. The successive portions of the section as shown in Fig. 1 are as follows: The filling structure L is a section taken on the section line A—B of Fig. 4; the inlet M for the pumping device and the auxiliary supply reservoir N are sections taken respectively on the section lines C—D and D—E; the supply reservoir device O is taken along the section line E—F; the outlet orifice structure P and the receiving conduit R are taken respectively on the section lines G—H and H—J.

The active supply of lubricant is carried in the reservoir O which is maintained full (to the overflow level X—X) by the auxiliary supply device N. The lubricant escaped from the reservoir O through the outlet orifice 12, whose elevation is represented by the level Y—Y,—the hydraulic head which causes the lubricant to flow thus being the distance between the levels X—X and Y—Y which is relatively small to insure a slow oil feed. From the discharge device P the oil is delivered to the receiving conduit 13 which is connected with the conduit 14 extending to the engine intake manifold 15 (by which the lubricant is conducted to the respective cylinder combustion spaces). The pumping device M serves to deliver an adequate supply of lubricant from the supply receptacle 16, which is advantageously made of glass so that the operation of the device may be inspected from time to time.

The following is a description of the details and cooperation of the aforementioned instrumentalities:

The supply receptacle 16 is advantageously carried in a metal jacket 17 (having sight openings 18 therein) held around the receptacle by clamping bars 19 engaging the terminal flanges 20 of the jacket, which bars are drawn together by bolts 21 against both the flanges and a supporting bracket 22 seated in and clamped between the grooved extremities 23 of the flanges. The bracket 22 is provided with a terminal 24 by means of which the bracket may be connected at an appropriate point to the supporting structure. This bracket may extend either below or above the jacket 17, depending upon the desired relation between the lubricating device and its supporting construction. In the present case the device is shown as supported above and secured to the cylinder head of the engine 25.

The receptacle 16 is closed by inner and outer covers 26 and 27 respectively, the former being flanged and bearing against gasket 28 to form a seal, and the latter extending around the bead 29 of the jar opening and engaging its under face by means of the flange 30. The outer cover is initially formed so that the flange 30 will clear the bead 29 to permit application, after which it is pressed into engagement with the flange by means of a die or other appropriate tool, whereby both the outer cover and the inner cover through contact with its marginal flange, are secured tightly in place.

The filling device L comprises a fitting 31 extending through both the inner and outer covers and supplied with a threaded closing plug 32 carrying a flexibly connected ring 32$^a$ larger than the filling opening to prevent loss of the plug.

The pumping device M comprises a U-shaped tube 33 extending from an inlet fitting 34 to the entrance of a tube 35 having a Venturi throat 36. The suction on the conduit 14 is communicated through the interior of the tightly closed receptacle 16 to the tube 33 and the air entering the tube through the opening 37 in the outer cover (communicating with the fitting 34) creates a still lower pressure in the Venturi throat 36, thereby causing oil to rise through the tube 35 and discharge into the auxiliary supply device N. The lower extremity 38 of the tube 33 is advantageously formed of some non-circular section such as a triangular shape, to insure free passages as at 39 for the entry of the oil past the extremity 38 into the Venturi throat. A check device in the form of a float 40 advantageously of wood or other light material and triangular in cross section is placed inside the fitting 34 to prevent the discharge of oil (through tube 33) from the opening 37. A screw plug 41 having a small bore 42 (about 1/64 of an inch in diameter) serves as a seat for the float 40 to check the back flow of lubricant which would tend to occur in case of back-firing or expansion of air in the receptacle while the engine is idle. The triangular shape of the float and the conical bottom of the receptacle 34 prevent the float from closing the entrance to tube 33 during the normal operation of the device. The space 43 inside the opening 37 and above the screw plug 41 may advantageously be supplied with an air filtering medium in the form of a felt plug or the like to exclude particles of dust.

The auxiliary oil reservoir in the device N is annular in shape, being formed by the inner and outer walls 44 and 45 of the fitting 46 which is supported by the inner cover through a screw cap 47 resting on the said cover and screwed into the fitting 46. The fitting is supplied with a bracket 48 which serves to center the tube 35 relative to the auxiliary oil reservoir. Oil discharging from the upper end of the tube 35 flows into the annular reservoir 49 and excess supply flows back through the annular passage 50 surrounding tube 35, the oil level in the auxiliary reservoir being determined by the upper edge 51 of the inner wall 44, thus insuring a uniform supply of oil to the main reservoir device O independent of the rate oil is pumped to the device N. Such supply occurs through the upwardly inclined passage 52 connecting the reservoir 49 with the reservoir 53, terminating in an orifice 54 which is not horizontal, being in this case vertical and forming a relatively sharp lower edge for the orifice. The non-horizontal orifice and this sharp edge prevent the forming of large drops of oil therein (through surface tension) which might interfere with the effective hydraulic head (the difference in the level between the edge 51 and the edge of the orifice 54), thus insuring a uniform supply of oil to reservoir 53 which is also independent of variations in manifold suction and, therefore, of rate of delivery of oil by the pumping device to the reservoir 49. The pumping device, particularly the inlet orifice 42 and the Venturi throat 36 are designed so that for minimum manifold vacuum (when the engine is running) the tube 35 will deliver oil slightly in excess of the rate of feed, the excess as above stated returning to the bulk oil supply in receptacle 16 through the passage 50. While with higher vacuums the delivery of oil to the auxiliary receptacle is greatly in excess of the feed, such excess delivery is not reflected in the delivery of an excess of oil to reservoir 53 (which would slightly raise its oil level by damming up above the overflow), thus insuring a constant level for reservoir 53 regardless of variations in engine speed. The latter level is determined by the upper edge 55 of the vertically adjustable tube 56 which projects somewhat above the edge of the inner tubular wall 57 of the reservoir. Oil supplied to reservoir 53 in excess of its rate of feed flows over the edge 55 and returns to the bulk supply in receptacle 16 through tube 56. Oil is fed at a rate depending upon the height of the level X—X, to the delivery device P through a passage 58 whose orifice 12 is not horizontal to prevent the formation of drops of oil therein (due to surface tension) which might vary the effective head regulating the oil delivery,—the arrangement and the purpose thereof being similar to that for passage 52 and its orifice. The delivery device P is in the form of a funnel shaped fitting 59 supported from the inner cover 26 by the screw cap 60. The mouth 61 of the delivery funnel is positioned above a wide-mouthed receptacle 62 connected with the oil receiving conduit 13 communicating with the suction conduit 14. As the oil issues drop by drop from the funnel mouth it enters the tube 13 and is drawn by the suction therein into the intake manifold. Both the fitting 59 and the reservoir 53 are provided with openings 63 and 64, respectively, communicating with the interior of the receptacle so that the interior pressures will be equalized with that in the receptacle 16.

The device R which effects a connection between the conduits 13 and 14 is in the form of a compression coupling comprising an interior fitting 65 into which the tube 13 is beaded and which is supported by the inner cover 26 and a coupling plug 66 threaded into fitting 65 and tightly gripping tube 14 at 67.

The lower end of level control tube 56 is threaded and screwed into a supporting sleeve 68 whereby it may be vertically adjusted to vary the level X—X. For this purpose the tube is provided with a projection 69 of non-circular cross section (square, for example) which enters a correspondingly shaped recess 70 in an adjusting screw 71. By rotating the adjusting screw (with a screw driver, for example) the tube 56 may be raised and lowered to vary the level X—X.

To adjust the level X—X to compensate for variations in viscosity of oil at different temperatures (which would obviously vary the rate of feed from the orifice 12), the tube 56 is provided with a temperature responsive device 72 in the form of a spirally arranged metal thermostatic strip. The thermostatic strip is supported at one end from a forked bracket 73 carried in notches 74 near the lower end of the feeding device O. Its other end enters a stirrup 75 extending below the supporting sleeve 68. The thermostatic strip is designed to coil and uncoil throughout the working range of temperatures to raise and lower tube 56 a sufficient amount to compensate for the variations in flow produced by temperature changes which affect the viscosity of the oil.

In automobile motors, the device is located so that the orifice 12 faces to the rear whereby the oil level X—X will be inclined to increase the effective head when the automobile is traveling up a hill and to decrease the effective head when the automobile is traveling down hill, thereby increasing or decreasing the supply of oil depending somewhat upon the load on the engine.

It is apparent from the foregoing that a regular but very slow lubricant feed may be reliably maintained (by the use of the low oil head in reservoir 53) without the restriction of any portion of the oil passage from the reservoir to the engine itself. The flow of oil is, therefore, independent of the presence of minute solid particles which would effectively clog any valve or other orifice throttled down to produce as slow an oil feed as that of the present device. On the other hand, a needle valve or the like might satisfactorily be employed in conjunction with the above described oil feed produced by the low hydraulic head because in such case, the valve would not need to be closed to a point where solid particles might collect and clog the throttled orifice, whereas if such valve were used to throttle an oil feed under a relatively high hydraulic head, the orifice would need to be closed (to secure an equally slow oil feed) to a point where minute solid particles would collect in and clog the throttled orifice. Moreover, the feeding device and the oil passages are constructed and arranged to avoid any siphonic or similar action which would under certain conditions, tend to withdraw oil faster than the intended rate of feed.

Obviously the invention is not limited to the details of the illustrative device since these may be variously modified. Moreover, it is not indispensable that all features of the invention be used conjointly since various features may be advantageously used in different combinations and sub-combinations.

Having described one embodiment of my invention, I claim:

1. In a liquid feeding device of the character described, the combination comprising a feeding reservoir having a discharge orifice and means providing a low hydraulic head to effect a low rate of feed from said orifice, an auxiliary supply reservoir, liquid delivery means which operates to deliver liquid to said supply reservoir at varying rates, said supply reservoirs being provided with means for delivering a uniform supply of liquid to said feeding reservoir independently of the varying rate of delivery to said supply reservoir.

2. In a liquid feeding device of the character described, the combination comprising a feeding reservoir having a discharge orifice, and means providing a low hydraulic head to effect a low rate of feed from said orifice, an auxiliary supply reservoir, a pneumatic lift device which delivers liquid to said supply reservoir at varying rates, said supply reservoir being provided with means for delivering a uniform supply of liquid to said feeding reservoir independently of the varying rate of delivery to said supply reservoir.

3. In a liquid feeding device of the character described, the combination comprising a feeding reservoir having a discharge orifice and means providing a low hydraulic head to effect a low rate of feed from said orifice, an auxiliary supply reservoir, a suction conduit subject to varying degrees of suction for conducting away the liquid at the rate delivered from said feeding reservoir, a pneumatic lift device actuated by the suction in said conduit which supplies liquid at rates varying with the suction to said supply reservoir, said supply reservoir being provided with means for delivering a uniform supply of liquid to said feeding reservoir independently of the varying rate of delivery to said supply reservoir.

4. In a liquid feeding device of the character described, the combination comprising a feeding reservoir having a discharge orifice and means providing a low hydraulic head to effect a low rate of feed from said orifice, an auxiliary supply reservoir, means for delivering liquid to said supply reservoir at varying rates, said supply reservoir being provided with means for delivering a uniform supply of liquid to said feeding reservoir independently of the varying rate of delivery to said supply reservoir, and means for varying said hydraulic head to compensate for temperature variations in liquid viscosity tending to vary the rate of discharge from said orifice.

5. A lubricating device for internal combustion engines comprising, in combination, a lubricant feeding reservoir having a discharge orifice and means for providing a low hydraulic head to effect a low rate of discharge from said orifice, a suction conduit connecting said reservoir with the engine suction, an auxiliary supply reservoir for supplying lubricant to said feeding reservoir, means actuated by the suction of said conduit for delivering lubricant to said supply reservoir, the rate of lubricant delivery varying with the intensity of suction, said supply reservoir being provided with means for delivering to said feeding reservoir at a substantially uniform rate independent of variation in delivery of lubricant to said supply reservoir.

6. A lubricating device for internal combustion engines comprising, in combination, a lubricant feeding reservoir having a discharge orifice and means for providing a low hydraulic head to effect a low rate of discharge from said orifice, and temperature responsive means for compensating for variations in viscosity of the lubricant tending to vary the rate of delivery from said orifice.

7. A lubricating device for internal combustion engines comprising, in combination, a lubricant feeding reservoir having a discharge orifice and means for providing a low hydraulic head to effect a low rate of discharge from said orifice, and temperature responsive means for varying said hydraulic head to compensate for the effect of variations in lubricant viscosity on rate of flow of the lubricant.

8. A lubricating device for internal combustion engines comprising, in combination, a lubricant receptacle having a cover, a feeding reservoir having a discharge orifice and means for providing a low hydraulic head to effect a low rate of discharge from said orifice, a suction conduit connected with the engine suction and communicating with the interior of said receptacle, a pumping device operated by the vacuum in said receptacle for withdrawing lubricant from said receptacle, an auxiliary supply reservoir for receiving lubricant from said pumping device and delivering the same at a uniform rate, independent of the rate of delivery of said pumping device, to said feeding reservoir, said feeding reservoir, auxiliary reservoir, pumping device and suction conduit being carried by said cover, whereby upon the independent removal of said receptacle they may be exposed for inspection or repair.

9. A lubricant supply device of the character described comprising, in combination, a glass lubricant receptacle, a metal jacket surrounding its sides and provided with clamping flanges, a supporting bracket positioned between said flanges, and clamping means for drawing said flanges together to grip said bracket and to cause the jacket to grip said receptacle.

10. In a device of the character described, the combination comprising a liquid feeding reservoir, a slidable member therein forming an overflow for maintaining a level in said reservoir, an outlet for said reservoir, and a temperature responsive device controlling said slidable member to adjust said level in order to compensate for variations in the liquid viscosity tending to change the rate of flow through said orifice.

11. A lubricating device of the character described comprising in combination, an oil supply receptacle, a reservoir above the oil in said receptacle and having an overflow for returning excess lubricant to said receptacle, a device for elevating lubricant from said receptacle to said reservoir, a feeding chamber associated with said reservoir and having an opening therein communicating with said reservoir through which oil enters said chamber from said reservoir, said feeding chamber having an outlet through which oil is fed, and a conduit receiving the lubricant from said outlet and adapted to be connected with a suction manifold to carry the lubricant thereto.

12. A lubricating device of the character described comprising in combination, an oil supply receptacle, a reservoir above the oil in said receptacle and having an overflow for returning excess lubricant to said receptacle, a device for elevating lubricant from said receptacle to said reservoir, a feeding chamber associated with said reservoir, and having an opening therein communicating with said reservoir through which oil enters said chamber from said reservoir, said feeding chamber having an outlet through which oil is fed, and means in said chamber for regulating the rate of flow of oil through said outlet.

13. A lubricating device of the character described comprising in combination, an oil supply receptacle, a reservoir above the oil in said receptacle and having an overflow for returning excess lubricant to said receptacle, a device for elevating lubricant from said receptacle to said reservoir, a feeding chamber associated with said reservoir and having an opening therein communicating with said reservoir through which oil enters said chamber from said reservoir, a conduit connected with said chamber for carrying away the lubricant and having its discharge extremity terminating within said device, a receiver located below said extremity to catch the oil as it is discharged, and a suction conduit connected with said receiver and adapted to be connected with a suction manifold, said device having a transparent wall adjacent said extremity whereby the rate of feed of lubricant therefrom may be observed.

14. A lubricating device of the character described comprising in combination, an oil supply receptacle, a reservoir above the oil in said receptacle and having an overflow for returning excess lubricant to said receptacle, a U-tube having one extremity communicating with the atmosphere and extending down into the oil in said receptacle and its other extremity discharging into said reservoir, said tube having an opening therein below the oil level in said receptacle to permit the entry of oil to be elevated to said reservoir, a feeding chamber associated with said reservoir and having an opening therein communicating with said reservoir through which oil enters said chamber from said reservoir, said feeding chamber having an outlet through which oil is fed, and means in said chamber for regulating the rate of flow of oil through said outlet.

15. A lubricating device of the character described comprising in combination, an oil supply receptacle, a reservoir above the oil in said receptacle and having an overflow for returning excess lubricant to said receptacle, a U-tube having one extremity communicating with the atmosphere and extending down into the oil in said receptacle and its other extremity discharging into said reservoir, said tube having an opening therein below the oil level in said receptacle to permit the entry of oil to be elevated to said reservoir, a feeding chamber associated with said reservoir and having an opening therein communicating with said reservoir through which oil enters said chamber from said reservoir, a conduit connected with said chamber for carrying away the lubricant and having its discharge extremity terminating within said device, a receiver located below said extremity to catch the oil as it is discharged, and a suction conduit connected with said receiver and adapted to be connected with a suction manifold, said device having a transparent wall adjacent said extremity whereby the rate of feed of lubricant therefrom may be observed.

16. A lubricating device of the character described comprising in combination, an oil supply receptacle, a reservoir above the oil in said receptacle and having an overflow for returning excess lubricant to said receptacle, a U-tube extending down into the oil in said receptacle and having an opening therein to permit the entrance of oil thereinto, said tube having its inlet extremity communicating with the atmosphere and provided with a fibrous filtering medium and having its other extremity discharging into said reservoir, a feeding chamber associated with said reservoir and having an opening therein communicating with said reservoir through which oil enters said chamber from said reservoir, said feeding chamber having an outlet through which oil is fed, and means in said chamber for regulating the rate of flow of oil through said outlet.

In testimony whereof, I have signed my name to this specification.

THOMAS VAN TUYL.